United States Patent
Viegers et al.

(10) Patent No.: US 7,554,441 B2
(45) Date of Patent: Jun. 30, 2009

(54) SYSTEM AND METHOD FOR REAL-TIME MANAGEMENT OF MOBILE RESOURCES

(75) Inventors: Arthur T. Viegers, Eindhoven (NL); Tristam Fenton-May, Dublin (IE); Roualeyn Fenton-May, Atlanta, GA (US); John C. Marous, Pittsburgh, PA (US)

(73) Assignee: Carrier Web LLC, Atlanta, GA (US)

( * ) Notice: Subject to any disclaimer, the term of this patent is extended or adjusted under 35 U.S.C. 154(b) by 219 days.

(21) Appl. No.: 11/580,906

(22) Filed: Oct. 16, 2006

(65) Prior Publication Data
US 2007/0149184 A1    Jun. 28, 2007

Related U.S. Application Data

(60) Provisional application No. 60/726,168, filed on Oct. 14, 2005.

(30) Foreign Application Priority Data
Oct. 13, 2006 (WO) ............... PCT/US2006/039880

(51) Int. Cl.
 *G08B 1/08* (2006.01)
(52) U.S. Cl. .................. 340/539.22; 340/870.34; 340/825.69; 340/521
(58) Field of Classification Search ............ 340/539.22, 340/539.23, 539.26, 539.21, 540, 825.69, 340/825.72, 870.34, 521
See application file for complete search history.

(56) References Cited

U.S. PATENT DOCUMENTS

| | | | |
|---|---|---|---|
| 4,412,170 A * | 10/1983 | Roesel, Jr. | 322/4 |
| 5,319,514 A * | 6/1994 | Walsh et al. | 361/59 |
| 5,594,425 A | 1/1997 | Ladner et al. | |
| 5,694,322 A | 12/1997 | Westerlage et al. | |
| 5,764,469 A * | 6/1998 | Slepian et al. | 361/92 |
| 5,920,129 A * | 7/1999 | Smith | 307/64 |
| 6,084,384 A * | 7/2000 | Kawamoto et al. | 323/269 |
| 6,380,813 B1 * | 4/2002 | Noumi et al. | 331/49 |
| 7,262,945 B2 * | 8/2007 | Galang et al. | 361/91.1 |

OTHER PUBLICATIONS

International Preliminary Report on Patentability for PCT/US06/39880, including Notification of Transmittal and Amended Claims under PCT Article 19.

* cited by examiner

*Primary Examiner*—Benjamin C Lee
*Assistant Examiner*—Daniel Previl
(74) *Attorney, Agent, or Firm*—Antonelli, Terry, Stout & Kraus, LLP.

(57) ABSTRACT

A system and method are disclosed for real-time management of mobile resources. The management system includes an on board system, a processor, and a data center. The on board system is provided with the mobile resource to be managed and includes a number of sensors to monitor various conditions. Each sensor collects information independently and asynchronously with respect to the other sensors. The processor collects the information from the sensors and saves it in the form of synchronous data. A continuous two-way connection is established between the on board system and the data center across a wireless communication network. The data center monitors at least one sensed state from the sensors based on receipt of the synchronous data from the on board system. The data center can also provide instructions to the on board system in response to the state that is being monitored.

38 Claims, 11 Drawing Sheets

SYSTEM AND METHOD FOR REAL-TIME MANAGEMENT OF MOBILE RESOURCES

This application claims priority under 35 U.S.C. 119 from U.S. Provisional Patent Application No. 60/726,168, filed Oct. 14, 2005, and PCT/US2006/39880, filed Oct. 13, 2006 which is incorporated in its entirety by reference herein.

BACKGROUND

The present invention relates to management of mobile assets and, more particularly, to a system for monitoring mobile assets in real time.

Wireless monitoring of remote assets, whether fixed machines, mobile vehicles, or inventory contained in mobile vehicles, is well described in the literature and in prior art. In general, technologies have been described to gather sensory data, modulate or encode that data as a digital or analog signal, transmit the signal to a processing center, demodulate or decode the signal, and then send it to a user. These monitoring systems gather and send data in, usually, one direction and at discrete times for later processing. When they do send data in both directions (data source to user and also user to data source), the transmissions are usually accomplished in batch mode, meaning a communication session is opened for the purpose of communicating data and then closed until a later time, when another session is opened again.

Complete management of any asset needs communication to be bidirectional and nearly continuous, as ever more complex operational procedures require real-time data analysis and updating of operation instructions. The tasks involved in management of assets in an operational setting include defining asset availability, defining current asset conditions that affect limitations in functions that can be implemented, in scheduling of the asset to implement a specific function, in monitoring the performance of the function by the asset against the performance plan, and in reporting information for function recording and accounting. Monitoring is but one piece of the management process described.

Demands for constant knowledge or security, temperature, humidity, pressure, and other operating conditions require more and more data gathering. Managing and minimizing theft, counterfeiting, public safety, and health all require constant monitoring and bidirectional information flow, with each information transfer being dependent on current conditions as well as previous data from the user perspective (like a storage container being cut open in a theft attempt) and changes in information in the management center environment (like a new order to deliver or a change in a customer's schedule).

The lack of defined communications networks and the possibilities of asynchronous changes in the structure of the asset and the linkages between the structural components makes the real-time, bidirectional operational control situation far more complex. For example, a truck (or tractor), trailer, and truck driver may all be linked together within one specific activity. However, drivers may change, trucks may switch trailers, and pallets and containers may be changed between trailers and warehouses. Data acquisition must therefore be independent for the smallest independent asset, and each data must be able to be communicated separately or together with other assets.

Making matters even more complex is that not only can the linkages change (driver to truck to trailer to pallet), but the structure can change, as in one case a trailer's temperature may need to be monitored and in another a humidity or a door or wall security may need to be monitored. These structural needs can change with location and operator. Further, the data and associated linkages must be maintained so they can be reported from any dimension. For example, a pallet could span different trailers, which span different trucks, which span different drivers. And reporting must offer complete data from the frame of reference of the pallet, from the frame of reference of the trailer, from the frame of reference of the truck, and from the frame of reference of the driver.

The distributed nature of the assets requires that the mobile asset define the linkage changes, though they may be prescribed from the management center. This means that while the management center may make the decisions, the mobile asset must originate, maintain, and manage the communication and must confirm changes in status, with the linkages either according to plan or not.

These management needs require real-time data acquisition, analysis, and communication in both directions, i.e., management system to asset and asset to management system. And communications must be guaranteed in order that the management system can rely on the automated system to present reliable information. And, the data gathering and data distributing mechanisms must allow data combination in any actual configuration, with the configuration being determined by the assets itself.

Conventional communications techniques involving landline connections and even computer network connections can be used for management of assets that are fixed in location. With connection to a gateway, to a wide area network or to the internet, information can be sent to many remote users. These systems can maintain a persistent (i.e., always on) connection, allowing, in principal, continuous communication and complicated feedback algorithms for asset control.

With recent advances in wireless networking, wireless network systems are now available that communicate via internet protocol techniques over a local network, though asset mobility is limited to a range of a few hundred feet. Remote monitoring and commanding with conventional information flow management concepts can be implemented using industry standard communications protocols if the mobile asset can be within range of a fixed communication gateway.

With straight line of sight between transmitter and receiver, certain other wireless communications techniques are possible. And high frequency and satellite transmissions have become feasible, although only for batch communication that does not permit true real-time control. With assets that move outside of available communications networks, these types of protocols are not practical since they do not manage and confirm communication delivery, they do not support either persistent bidirectional information flow from multiple configuration components on each end of the communication, or they simply do not involve practical costs.

Existing techniques can be used to monitor and report status of assets with wider mobility ranges, but monitoring and reporting does not, in and of itself consider real-time, continuous bidirectional management information flow with guaranteed communication integrity.

Transmission for these monitoring needs can be implemented by a variety of wireless technologies. Some such wireless technologies employ cellular radio transmission, some utilize satellite networks, and some may use a specific local and/or private radio system. Many wireless remote monitoring systems utilize batch communication, and some systems employ feedback mechanisms to command a remote operation.

Batch communications generally involve finite commands sent periodically from remote asset to a data center. The communications may specify specific information at specific intervals, and throughput is often limited to a subset of information necessary to fully implement the management function. In order to implement certain management functions (e.g., such as real-time sales order negotiation and booking, order scheduling and routing, and execution and reporting of mobile activities), however, information must be organized and coordinated in multi-level, real-time feedback loops with guaranteed integrity. Also, the structure of the commanding and reporting must allow for data combination as well as parsing on both asset-side and management-side, with a real-time asset-configurable methodology.

There exists a need for a system capable of providing data communication sufficient to permit operational efficiencies with high reliability.

There also exists a need for an always-on, persistent connection between the decision control point and an operations execution asset for providing true real-time command, control, and communication.

There also exists a need for an ability to control the environmental status of the asset and any inventory or other material, with commanding and feedback allowing automated data transactions without human intervention.

SUMMARY OF THE INVENTION

These and other needs are addressed, at least in part, by the present invention, wherein a wireless mobile resource management system provides a persistent connection for exchanging asynchronous information contained in a synchronous data stream.

In accordance with one or more aspects of the present invention, a wireless mobile resource management system includes an on board system, a data center, and at least one customer system. The on board system includes a position locating system for determining a location of the on board system. A plurality of sensors are provided for monitoring various conditions and independently collecting information corresponding to sensed states of the conditions being monitored and collecting the information asynchronously with respect to other sensors. The on board system further includes a transceiver for transmitting and receiving information over a wireless communication network. The management system includes a processor for collecting the asynchronous sensor data collected by the plurality of sensors and saving the asynchronous data in a synchronous format. The management system also includes a data center for monitoring at least one sensed state from the plurality of sensors and providing instructions to the on board system in response to the at least one monitored sensed state. The data center includes a communication server for establishing a first communication link with the on board system over the wireless communication network, and further establishing a second communication link over a data communication network; a data center processor for processing synchronous data, and generating parallel streams of sensor data corresponding to the asynchronous sensor data collected by the plurality of sensors; and a database for storing operational transactions of the on board system at predetermined time intervals and/or upon a change in a sensed state of at least one of the conditions being monitored. A continuous two-way connection is also established between the on board system and the data center across the wireless communication network, and the synchronous data saved by the processor is synchronous with respect to the data center processor.

In accordance with one or more specific embodiments of the present invention, the position of the on board system can be determined using satellite based networks, cellular based networks, or both. The conditions being monitored can also be related to a vehicle that is, for example, self powered. The conditions can include unauthorized access to the vehicle, unauthorized movement or transportation, etc. A towable unit can be provided for selective coupling to the self powered vehicle. Under such circumstances, an additional on board system can be provided with the towable unit.

There has thus been outlined, rather broadly, the more important features of the invention and several, but not all, embodiments in order that the detailed description that follows may be better understood, and in order that the present contribution to the art may be better appreciated. There are, of course, additional features of the invention that will be described hereinafter and which will form the subject matter of the appended claims.

In this respect, before explaining at least one embodiment of the invention in greater detail, it is to be understood that the invention is not limited in its application to the details of construction and to the arrangements of the components set forth in the following description or illustrated in the drawings. Rather, the invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These, and various features of novelty which characterize the invention, are pointed out with particularity in the appended claims forming a part of this disclosure. For a better understanding of the invention, its operating advantages and the specific benefits attained by its uses, reference should be had to the accompanying drawings and preferred embodiments of the invention illustrating the best mode contemplated for practicing the invention.

DETAILED DESCRIPTION OF PREFERRED EMBODIMENTS

Figure 1:
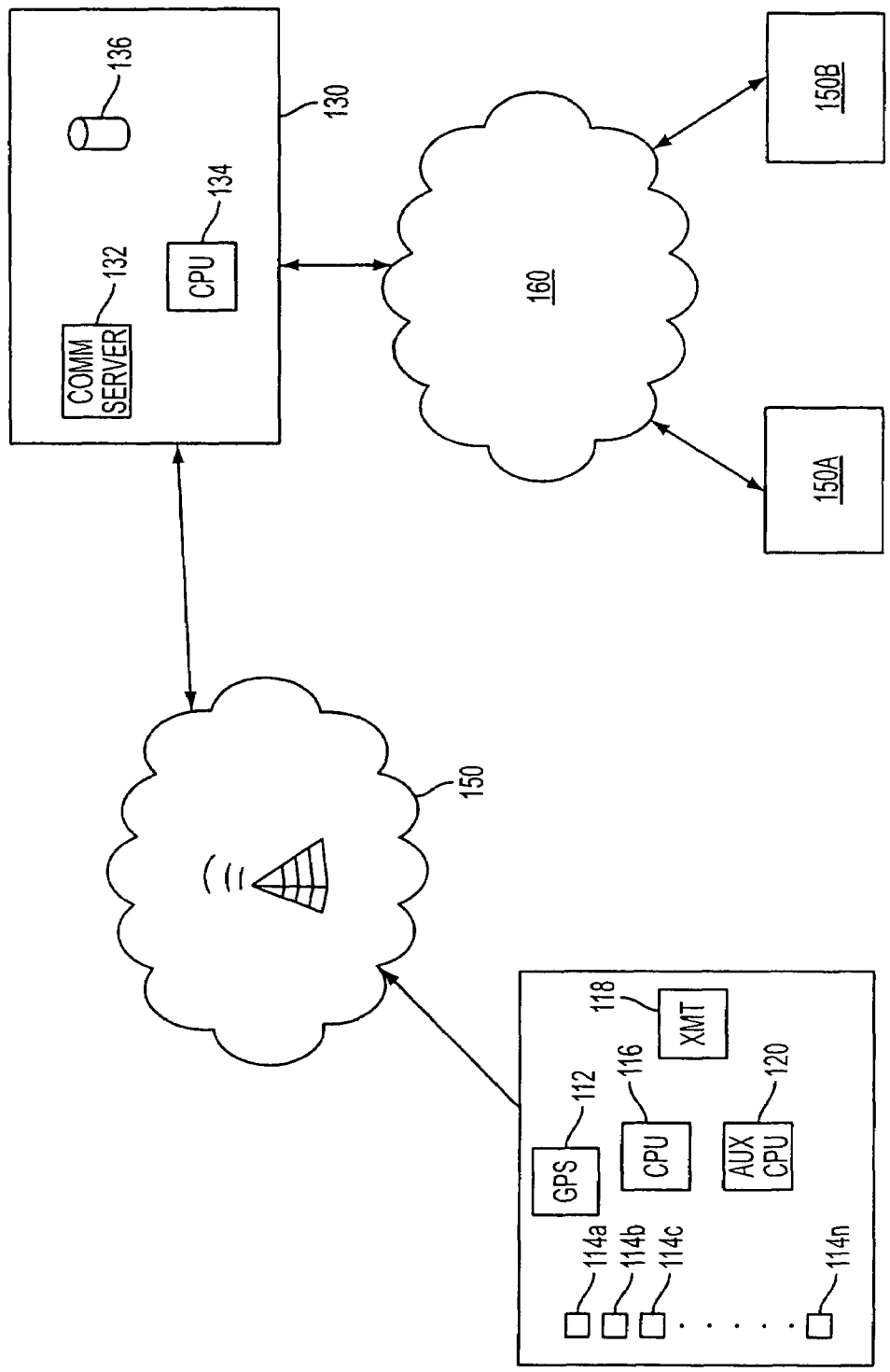
FIG. 1 is a block diagram illustrating one embodiment for the architecture of the present invention.

Reference now will be made in detail to preferred embodiments of the invention. Such embodiments are provided by way of explanation of the invention, which is not intended to be limited thereto. In fact, those of ordinary skill in the art will appreciate, upon reading the present specification and viewing the present drawings, that various modifications and variations can be made.

For example, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

General Overview of the Invention

The invention described is a method of commanding operations requirements between a management center or centers and a collection of linked mobile assets, continuously monitoring a variety of operational status against the required commands, changing required commands on a moment's notice, reporting of any condition outside of allowed bounds, and feeding back status continuously to provide a record of performance and to allow continuous optimization of the assets' objectives and re-commanding; the variety of commands and operational condition includes parameters unrelated to each other in origin, in execution, in status data acquisition, and in time, but related in terms of affects on the outcome of the mobile exercise. This method permits assets to be mobile anywhere, globally, and it permits multiple assets to be grouped and ungrouped, with multiple levels of groupings in the field without human intervention. It gathers both asynchronous and synchronous data and provides a communication mechanism that guarantees communication integrity and enables practical transmission cost. It further enables the base of data to be accessed by entities with interests of planning, logistics, security, regulatory reporting, and financial reporting.

Operational parameters include truck attributes, trailer attributes, driver attributes, and combinations of these attributes that may change at different times and with different activities. But, results of the mobile exercise, such as execution according to plan, time of individual activity executed, cost of individual or total activities executed, and effects on requirements such as regulatory matters, customer service matters, and financial and economic matters, may all be intricately linked, requiring consideration of all parameters simultaneously.

The present invention can include carious dimensions, for example, management side dimension (consisting of a server-side sub-system and a back end sub-system), an on-board dimension, and a communication dimension. The communication dimension is used to maintain a persistent (always on), real-time, bidirectional connection between a vehicle (the on-board dimension) and a server (in the management dimension). A vehicle-originated message is sent to the server, and when the connection is detected, a handshaking techniques used to verify the communication. The part of the communication dimension that represents the invention is the intertwining of the three dimensions, i.e., the intertwining of the modem-to-server connection with a 4-level mobile control unit.

The four levels of the mobile control unit are the modem, the main control, the auxiliary control, and the sensory control. The modem communicates with the main control but also emits data to the auxiliary control so that the auxiliary control can manage simultaneous connection between main control unit and multiple sensory control units. The auxiliary control unit also monitors for robust operation of the entire on-board system and corrects any on-board component that produces an error.

The modem continuously scans for a cellular network, and when it finds one it establishes a data connection to an internet gateway. The modem then turns control of the data transmissions (from the vehicle to the server) to the main control unit. The main control unit is responsible for gathering data from any sensory control unit in the on-board system. These sensory control units are connected to the auxiliary control unit, which maintains a continuous data connection between each sensory control unit to the main control unit.

Under normal circumstance, the main control unit manages the sensory control units through the auxiliary control unit, which monitors main control unit integrity in order to permit communication between the sensory control unit and main control unit. The main control unit receives data from the sensory control units and combines the data into one message protocol that can be cost-effectively transmitted over the cellular network to the server. The data from the sensory control units are asynchronous to each other and of differing data structures. The auxiliary controller converts the data from the sensory control units into data that is synchronous to the main control unit so that it can merge them into the synchronous, consistent protocol required of digital cellular communication.

The sensory control units are data gathering systems such as wired sensors, RFID receivers that receive asynchronous signals from an RFID transmitter connected to an environmental or vehicle status sensor, serial data receivers such as engine status, brake and tire status, and load status sensors that retrieve data from the vehicle, and, of course, operator login, messaging, and activity change notification. Since an always-on connection exits between the vehicle and server, a real-time commanding and re-commanding capability is established. Commands are sent from the back end or server-side sub-systems to the vehicle/asset. The on-board sub-systems monitor performance on a sub-second (engine status) or second basis (position) or minute basis (trailer/load/container), and these asynchronous and parallel status parameters are put together, or 'packed' into a synchronous data set for economical communication to the server. In addition to the regular status reports, transactions (such as door openings/closings, start-motion and end-motion events, and trailer-container hitching/unhitching events, are reported instantly.

On board events can be sent to the server asynchronously, but this requires high latency and high communication cost—so much so that the data is not available for timely re-commanding. Therefore, the CWMP (CarrierWeb Message Protocol) was developed to document and communicate a large number of on-board data in short time period and with complete integrity and with low cost, and in both directions (on-board to server and server to on-board).

If the data is sent to the server in a timely fashion, then the combined (or packed) data can be parsed and sent to specific analysis processors for re-commanding. The re-commanding might be a changing of a route, a temperature adjustment need, a security status request, a driver message, etc. Such re-commanding can enhance utilization of the vehicle/asset, such as by changing a route, modifying driving patterns (acceleration, deceleration, cruise time, idle activities, etc.) for better fuel costs, adjusting tire pressure or adjusting distance from a near-proximity vehicle for safer driving. If such re-commanding is not automated and implemented in real time (fast enough to accomplish an optimization objective), then the exercise would be fruitless. Therefore, a multiple parallel synchronization and packing of on-board operating data and real time, constant communication between vehicle and server is required for true mobile resource management.

Exemplary System Architectures

Turning now to the drawings, and initially to FIG. 1, a management system 100 is shown for managing wireless mobile resources in accordance with one or more embodiments of the present invention. The management system 100 includes an on board system 110, a data center 130, and at least one customer system 150A, 150B (collectively 150). While only one on board system 110 is illustrated, it should be noted that the management system 100 of the present invention is capable of supporting multiple on board systems. Further, multiple customer systems 150 (or none) can be provided within the management system 100. The on board system 110 includes a position locating system such as GPS locator 112 that is used to determine the location of the on board system 110. The on board system 110 also includes a plurality of sensors 114a-114n (collectively 114) capable of monitoring different conditions. For example, the sensors 114 can monitor the opening and closing of doors, tire pressure, fuel usage, etc. The sensors 114 independently collect information corresponding to the conditions they are currently monitoring. As such, the information collected is asynchronous between the sensors 114. For example, the information collected by sensor 114a is asynchronous with the information collected by sensor 114b. In fact, the two sensors (114a and 114b) may collect data at different time intervals and at different sampling rates.

An on board processor 116 receives the asynchronous data collected by sensors 114 and saves in the form of synchronous data that can be efficiently transmitted. The on board system 110 also includes a transceiver 118 that transmits and receives information to and from the on board system 110 over a wireless communication network. In accordance with one or more embodiments of the present invention, the wireless communication network can be in the form of a cellular network 150 using any appropriate protocol such as GPRS, TDMA, CDMA, etc.

The data center 130 monitors various conditions detected by the sensors 114. The data center 130 can subsequently perform various steps, such as issuing commands in response to the conditions detected by the sensors 114. According to various embodiments of the invention, the data center 130 can include a communication server 132 in order to communicate with, for example, the on board system 110. The communication server 132 can be configured to establish communication links using wireless communication networks 150 and data networks 160. Data networks 160 provide access to the Internet, local area networks (LAN), wide area networks (WAN), etc. Further, such networks can include components of terrestrial networks, satellite networks, or both. In accordance with one or more embodiments of the present invention, the communication server 132 is used to establish a communication link with the on board system 110 across a wireless network 150. Furthermore the communication link is in the form a continuous two-way connection. The communication link allows the communication server 132 to receive data from the on board system 110 in either synchronous or asynchronous format.

The data center 130 includes a data center processor 134 that processes the data received from the on board system 110 based, at least in part, on the format of the data. For example, if the data is in synchronous format, then the data center processor 134 would process the data to generate streams of sensor data that are representative of the asynchronous sensor data collected by the plurality of sensors 114. The data center 130 also includes a database 136 for storing various information related to the resource management system 100. For example, according to one or more embodiments of the present invention, the data center processor 134 stores operational transactions of the on board system 110 at predetermined time intervals in order establish a record of sensor data representative of the state of a vehicle carrying the on board system 110. The state of the vehicle can include, but is not limited to, location, status of cargo, connection to trailer, environmental conditions, etc. Furthermore, the predetermined time intervals do not need to be fixed. They can be of variable lengths sufficient for reconstructing the state of the vehicle over a desired time period. The database 136 can also be used to store instructions that can be retrieved, for example by the data center processor 134, to transmit commands the on board 110 system in response to various sensor information.

In accordance with various embodiments of the invention, the communication server 132 can also be used to establish one or more communication links with the customer systems 150. Accordingly, sensor data received from the on board system 10 can be immediately transmitted to the customer system 150. For example, if a vehicle combination such as a tractor/trailer contains the on board system 10, then the customer system 150 can correspond to a dispatch center which owns the tractor/trailer and bears responsibility for safe delivery of certain contents, or assets, being transported. Based on the sensor information received from the data center 130, various decisions can be made at the customer system 150 including, for example, commands to reroute the tractor/trailer, adjust environmental settings, identify subsequent stops, redirect to avoid traffic, etc.

Figure 2:
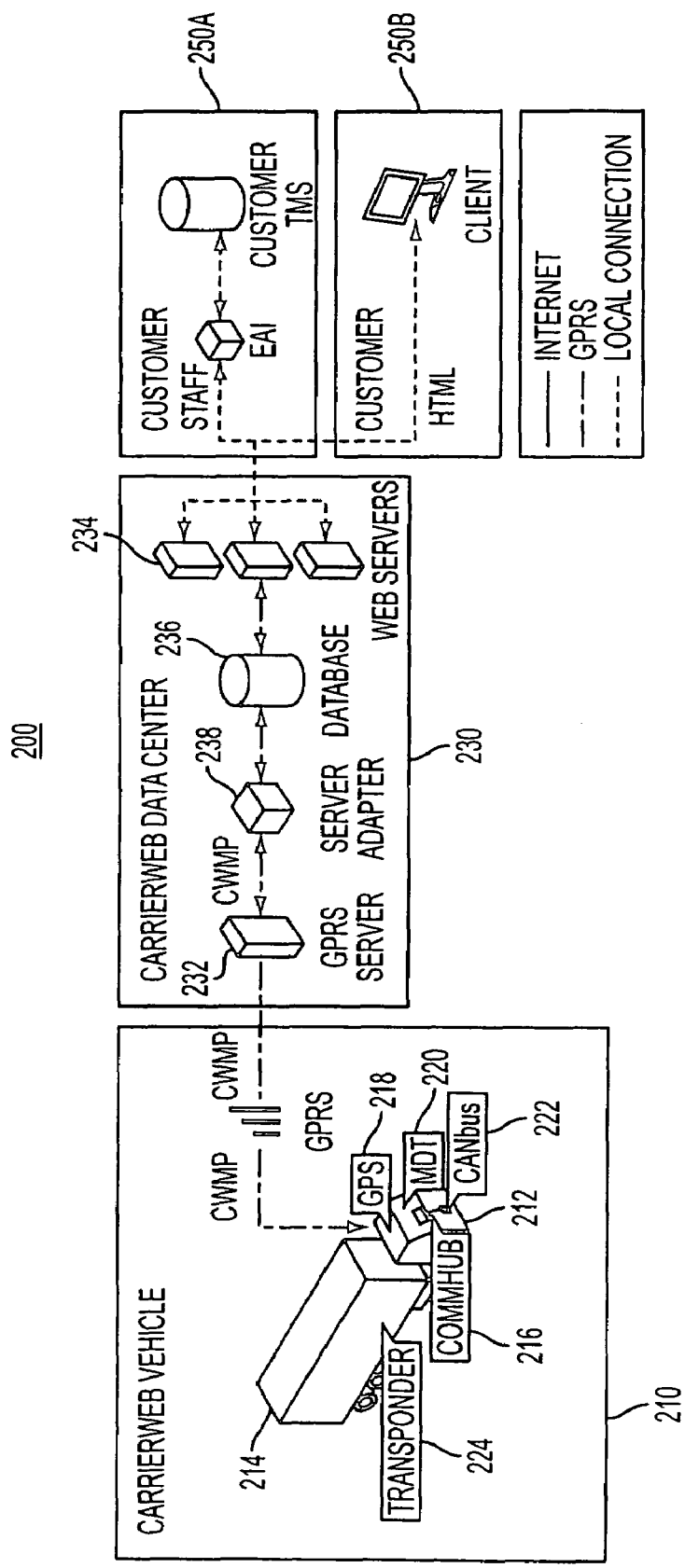
FIG. 2 is a diagram illustrating an alternative embodiment for the architecture of the present invention.

FIG. 2 illustrates an alternative embodiment for a resource management system 200 in accordance with the present invention. The resource management system of FIG. 2 includes a mobile system 210 which consists of a tractor 212 and trailer 214 combination, a data center 230, and two customer systems 250. The mobile system 210 can be configured to include one or more on board systems, as previously described. According to the embodiment illustrated in FIG. 2, the tractor 212 includes a communication hub 216, a position locating system in the form of a GPS system 218, a CANbus 222, and MDT 220. The trailer 214 also includes a plurality of sensors/transponders 224. As illustrated by the broken lines, the mobile system 210 communicates with the data center 230 using a wireless communication network and General Packet Radio Service (GPRS). While, FIG. 2 illustrates a communication server utilizing GPRS standards, it should be noted that any standard for transmitting packet data over a wireless network could be used instead.

The data center 230 includes a communication server 232 configured to receive packet data using GPRS standards. A server adapter 238 is provided to interface the communication server 232 with a database 236 which stores various information. A plurality of web servers 234 is provided to implement various functions of the data center 230, such as processing the data received from the mobile system 210. According to the embodiment of the invention illustrated in FIG. 2, at least one of the web servers 234 can establish a communication link over a data network such as a WAN, LAN, or the Internet.

The two customer systems 250 are able to interface with the data center, if and when necessary, using a communication link across a data communication network.

Figure 3:
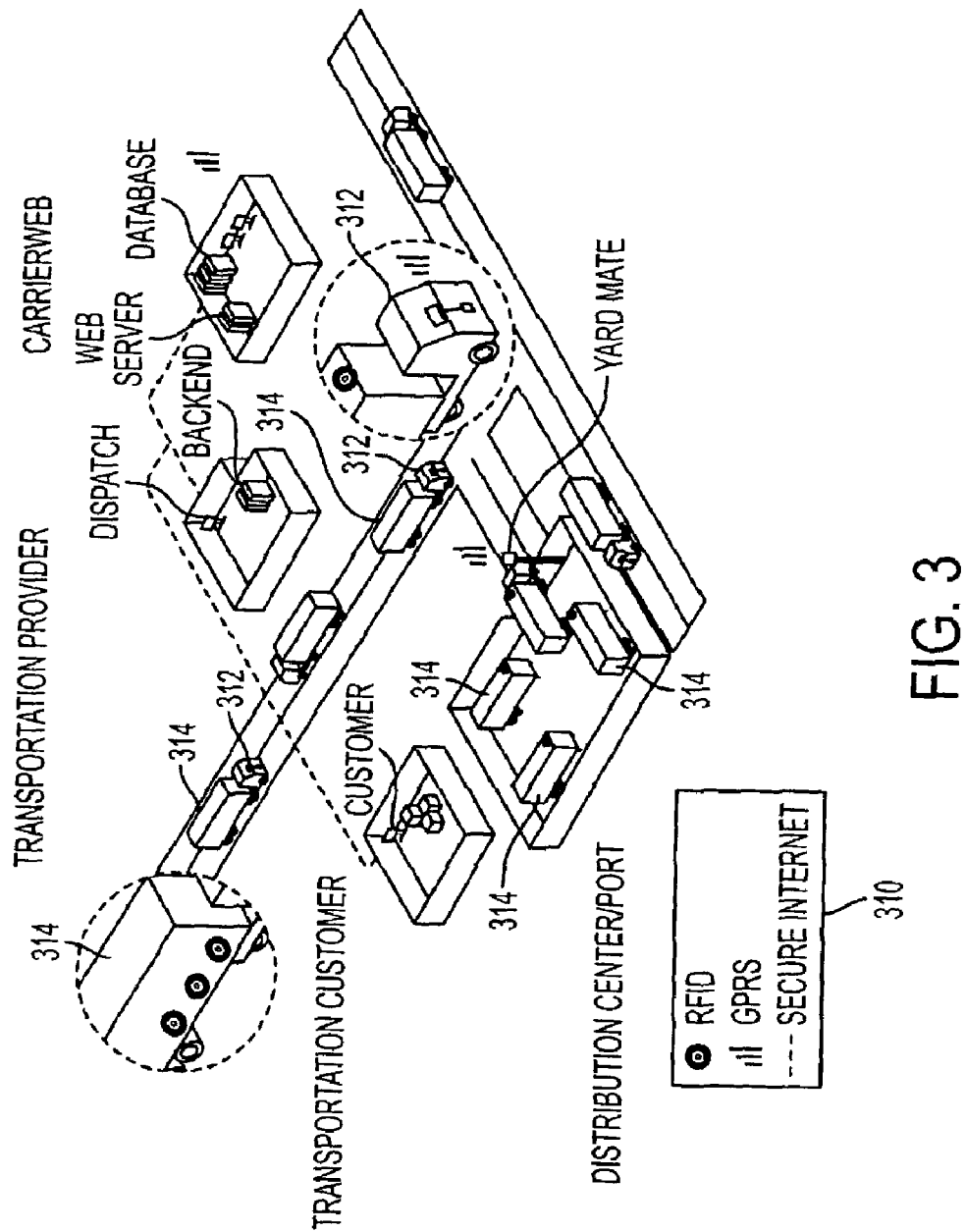
FIG. 3 is a diagram illustrating an alternative embodiment for the architecture of the present invention.

FIG. 3 illustrates an alternative embodiment for a resource management system 300 in accordance with the present invention. The embodiment of FIG. 3 can be used, for example, in situations where vehicles are located within a specified area that is periodically unattended. As shown in FIG. 3, a plurality of vehicles configured as tractor 312 and trailer 314 combinations enter and leave a distribution center 310. Trailers 314 can also be stored in the distribution center 310 until such time as they are loaded with cargo and/or connected to a tractor 312 or other appropriate self-powered vehicle. According to such an embodiment, on board systems can be provided on each tractor 312, trailer 314, and/or tractor and trailer combinations. Additionally, specific sensors can be provided, for example, to monitor changes in the state of doors to the tractors 112 and/or trailers 114, as well as unauthorized movement. In particular, such movement can indicate potential theft.

Figure 4:
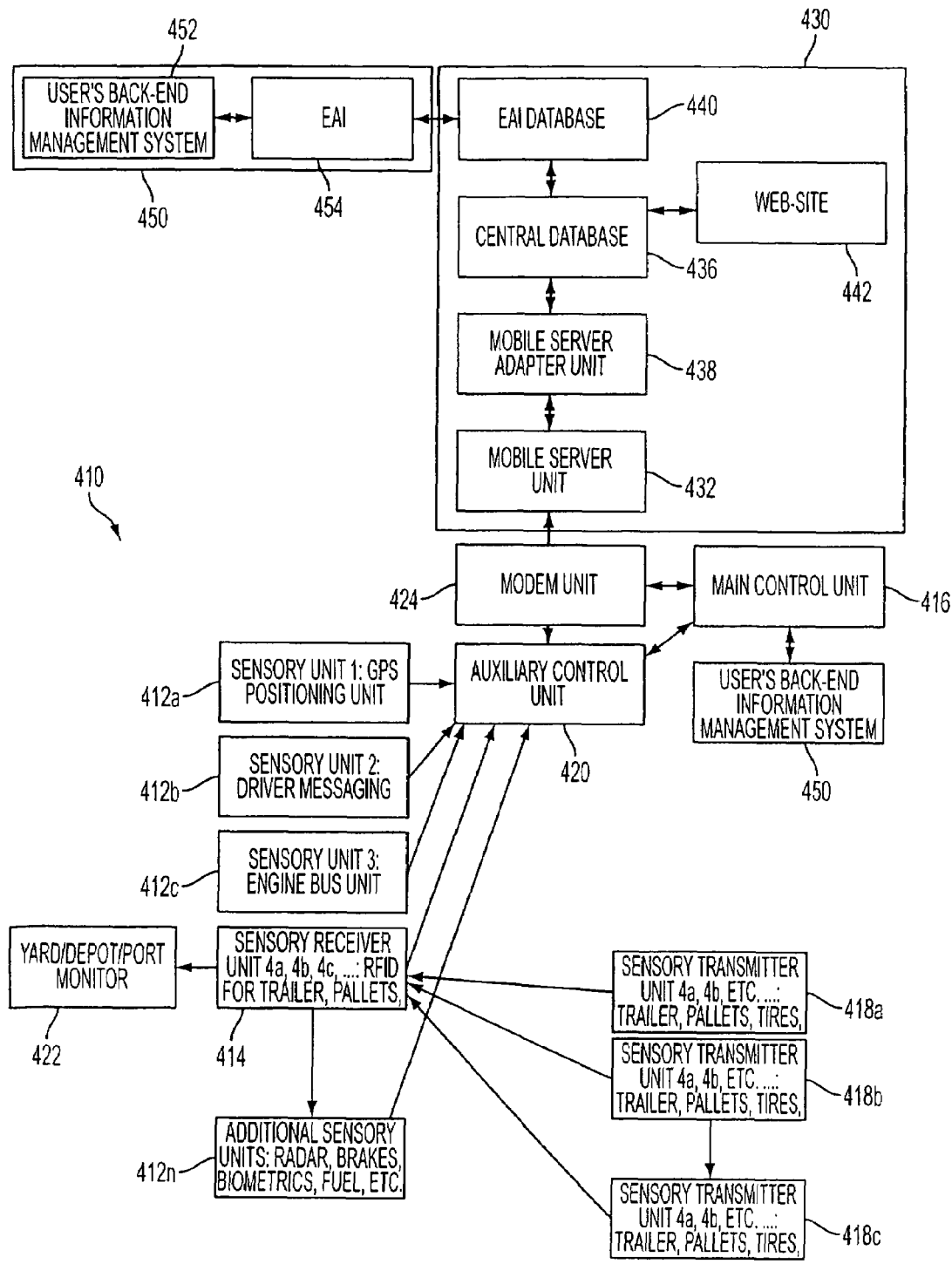
FIG. 4 is a block diagram illustrating an alternative embodiment for the architecture of the present invention which includes various optional components.

FIG. 4 is illustrates an alternative embodiment for the architecture of the present invention, which includes various optional components. According to the embodiment illustrated in FIG. 4, the on board system 410 includes a number of sensors such as a GPS positioning unit 412A, a driver messaging sensor 412B, an engine bus sensor 412C, etc. (collectively 412). A sensory receiver unit 414 is also included to receive data from various sensor transmitters 418, including those incorporating RFID transmitters. The sensory receiver unit 412 further exchanges information with a yard or port monitoring system 422. The on board system 410 also includes a main control unit 416 and auxiliary control unit 420 for processing information, for example, from the sensors 412. A modem unit 424 is used to transmit information to a data center 430. The data center 430 includes a mobile server unit 432 (or communication server) capable of establishing a communication link over a wireless network. The data center 430 also includes a central database 436, mobile server adapter 438, an external application interface (EAI) database, and web server 442 capable of hosting a website. The architecture of FIG. 4 also includes a customer system 450 that includes an information management system 452 and EAI 454.

According to the embodiment of FIG. 4, in order to combine multiple asynchronous parallel data streams and link them to each other in real time, a multi-sensor packing and synchronizing system, a communication system with reception integrity, and a data parsing system is used. This system allows multiple information to be communicated simultaneously to and from different parts of a sub-system, with a single data communication stream used for data integrity, communication integrity, data security, and for affordable cost, all with real time (fast enough to enable reporting, processing, and re-commanding).

Within each sub-system illustrated in FIG. 4 (i.e., on board system 410, data center 430, and customer system 450), the data transmitted to another sub-system is synchronized and packed together into a time/cost-economical package and communicated to another sub-system. And within each sub-system, all data received from the communicating sub-system is parsed, processed appropriately by asynchronous, parallel processors. Then, to communicate with another sub-system, data from the asynchronous, parallel processors are merged and sent out to the receiving sub-system.

On Board Sub-System

Figure 5:
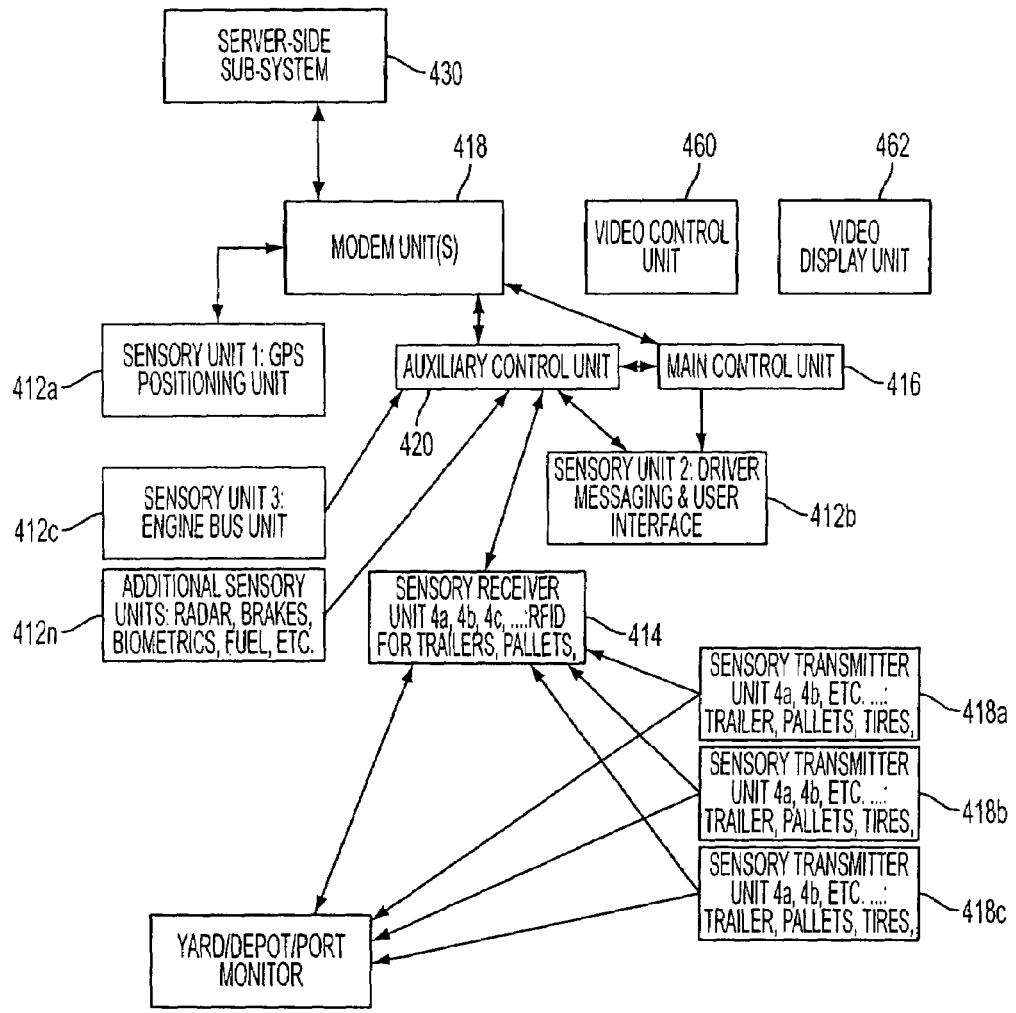
FIG. 5 is a block diagram illustrating details of the on board system.

FIG. 5 illustrates of the on board system in accordance with at least one embodiment of the present invention. In addition to the components previously described, the on board system illustrated in FIG. 4 optionally includes a video control unit 460 and a video display unit 462. Data is gathered on board and put together into a packed, synchronous structure that supports asynchronous communication to the server.

The on-board communication utilizes a positioning device such as GPS communication with the GPS satellite system, a 2+G cellular system such as GPRS or CDMA (or a wifi or wi-max environment, and/or satellite communication network), wireless radio-RFID communication between sensory units on the vehicle or in trailers and the Auxiliary Control Unit, and also wired communication between sensory/actuary devices on the vehicle or in trailers and the Auxiliary Control Unit.

The various on-board data acquisition devices, each gathering data and communicating it to the auxiliary and/or main on-board control unit in different data formats, at different times, and at different data communication rates. Some of these inter-device communications are serial and asynchronous, some are serial and synchronous, and some are parallel and synchronous, and some are parallel and asynchronous.

The devices that acquire data from the vehicle, and their message formats and data types are as follows:
Position data from GPS satellite: NMEA format serially, but asynchronously.
Speed data from vehicle:
Via canbus, asynchronous and serial, binary or hex data
Via Speed Sensor, asynchronous and parallel, by analog frequency
Via Tacho-Pulse, asynchronous and parallel, by digital level shift
Load condition, trailer status & condition, security condition
Via RFID receiver, asynchronous and serial
Via wired connection to sensor
Truck-Trailer identification
Job identification and status, linked with driver status, engine/fuel/tire/brake status, regulatory/availability status
Driver identification, independent of other parameters
Driver messaging and activity input: asynchronous and serial
Fueling Data:
Via fuel card server connection; via fuel use; use calculated whenever a transaction occurs via fuel stores sensor: asynchronous and serial
Tire Data: from TRFID via asynchronous and serial: asynchronous and serial
Brake data: asynchronous and serial, from brake sensor, which could be via canbus;
Acceleration/Deceleration data: asynchronous and serial
Radar data for near-vehicle proximity in combination with speed and position
Biometrics data—fingerprint log in and distress messaging
Video data for security via real-time video, with compression
Car alarming/blocking
Navigation—either by sending current position and next job position to a navigation engine which then sends data back to the auxiliary control unit for passing along to the display or by referring real-time traffic/road condition updates from a remote server to define minimum drive time or trip duration or fuel use based on real-time actual road conditions, congestion, etc, and by also considering trucking attributes such as bridge height and road weight limitations, and then parsing this data from the packed, synchronous message and passing it along to a screen to be displayed, including text to speech interfacing.

In order to provide for real-time management of the vehicle resource and any goods in transit, data from multiple on-board sources must be acquired and managed with guaranteed delivery and data integrity (deleting non-understood messages and re-communicating them). The data received must be native to the on-board device, meaning the device must monitor its sub-system asynchronously from each other. The data must then be acquired, verified, logged, buffered, and then turned into one data stream for serial communication to the server. They must be synchronized with respect to each other in order to be able to supply a total vehicle condition record to the user.

The Auxiliary 420 and Main Control Units 416 acquire data via a parallel-asynchronous to serial-synchronous packing system that analyzes all the serial data bit by bit, first reviewing a bit from device #1, then device #2, . . . device # n, then reviewing the next bit from device #1, then #2, then #n, and establishing a data record for each serial data transmission. The control units also are monitoring and establishing data records for the parallel inputs from other ports in which the parallel devices are connected for continuous monitoring of these parallel devices.

After composing a data transmission from each on-board device, the Auxiliary Control Unit 420 puts together the data and merges it into a single data stream that is then packed (multiple data combined according to a certain data protocol) into a binary representation by the Main Control Unit 416 and embedded into the communications message to the server that is synchronous to the on-board device but asynchronous to the server. The Main Control Unit 416 not only packs and merges the data with other operating data, but it also manages time stamping and position stamping and driver stamping and trailer stamping and truck stamping, so a complete record of activity status and transaction is reported.

With any operational transaction, all data available on board is sampled and recorded, along with time and date and position and driver and vehicle(s) stamps. This provides a data set able to define status at any cut of the data in time and a data pattern to define the operational status and condition between any two data cut points (in time). Operational transactions include, but are not limited to:

Driver login, login acceptance, and activity changes
Vehicle power up, start, stop, hitch, unhitch
Inventory load, unload, environmental status change, door status change
Change of load operational bounds required per job
Job start/stop
Vehicle status OK, fault condition
Change of vehicle operational bounds
Change of vehicle/driver trip or job plan or requirements Data acquired on-board must be organized in a fashion such that any event can be transmitted to the server by itself or can be combined with other transaction/status information.

The communication to the server must be performed in a secure and guaranteed fashion to avoid bad data. For operational control, bad data cannot be allowed, and data acquired must be received by the user. For this reason, the CarrierWeb Message Protocol (CWMP) was developed. The CWMP is a on-board parallel-synchronous serial data stream that supports serial data communication asynchronously to the server, where the data embedded in the communications is secure and is time, location, drive, vehicle, and serialization-stamped to be able to match data sent from the on-board device to data received by the server.

The term parallel-synchronous means that multiple data is sent together in a fashion that is synchronous to the on-board system but asynchronous to the server. The server then parses the data back into a serial stream that can be managed by an appropriate processor. Data is asynchronous to other data if each data is created and recorded independently and whose transactions occur and time points that are not related to the time points of transactions of the other data. A transaction is a change of value of any sensor by more than a predefined magnitude. Different data that are asynchronous can be synchronized according to the present the invention by recording, transmitting, storing, and reporting, at the point of time of any data transaction, the value of every sensor in a subset of all sensors that may be of interest to that particular transaction. A data record containing the value of each sensor in the subset of interest, at the time periods of any two transactions, the transactions being possibly of different sensor types, allows the generation of an activity-based operations reporting and management.

In order to offer plug 'n play capability with any vehicle having any combination of on-board devices as chosen by the user, this CWMP must either be employed by each device or must be implemented in conversion of data from peripheral device native form to the CWMP form by the Auxiliary Control Unit 420.

The Auxiliary Control Unit 420 automatically detects devices connected to it and assigns a port to the device. It then establishes a connection table to determine how to route communications to/from the main and/or auxiliary control unit from/to the sensory unit. Specific benefits attained with the CarrierWeb methodology and from implementation of on-board data acquisition components in the on-board system of the invention are:

Load monitoring with immediate alarming and re-commanding to reduce load loss/waste
Reduced occurrence of incorrect activities due to wrong driver/vehicle or load combinations
Navigation—real time updates of road conditions to reduce drive time or trip time of fuel, driver, and capital cost
Security Monitoring—Biometrics-triggered monitoring and door status monitoring to immediately alarm and re-command a vehicle upon unacceptable status condition;
Safety Monitoring-vehicle proximity in combination with speed & speed limit by position, tire, brake conditions and for reporting and recommending the vehicle into required rest activities;
Driver performance data reporting to optimize fuel use.
Activity-Based Costing can be performed by analysis of all cost-related parameters, knowing the status of each cost-related data type with every operational transaction and between each consecutive, in time, operational transaction
Virtual booking of loads, using drive-time remaining, expected trip completion, next job locations, etc, to minimize dead-head (driving without a load) and dwell (waiting for a job) and to book and plan next trips and jobs
Immediate recording of billable parameters to support invoicing of time-dependent job activities or demurrage and detention.
Load Monitoring: The load is monitored by sensors communicating to the auxiliary control system by either a wired or an RFID (wireless) connection. The RFID system uses an active transmission system, where the RFID signal is sent from a tag to the RFID receiver, called a Base Station, and the base station then prepares the serial, asynchronous message to the Auxiliary Control Unit. The Base Station must implement a sub-set of the CWMP in order to be able to communicate with the MDT or with a Auxiliary Control Unit or a modem, if the MDT is not in the configuration or is asleep. The RFID system features that enable CWMP and Total Transport Technology are:

- Active (battery powered), programmable transmission period with random modulation of period minimizes radio collisions
- Passive transmissions to coordinate arrival/departure events with other trip parameters
- Concurrent high power data transmission with low power signal strength transmission for hitching detection and simultaneous transmission of ID, status, and sensory data
- Signal strength data for position detection
- Motion-dependent transmission period for long battery life and both a) and monitoring for long periods at rest and b) short period transmissions for port movement tracking.
- Periodic status updates and also instantaneous event transmission.
- Auto-routing wireless network for self-transferring of data from mobile mesh to fixed mesh and vice versa.

The process of data flow is:

- A controlled-power identification and signal strength is transmitted; a truck receiving this data detects and manages this data based on signal strength of the transmission.
- A max power signal is transmitted with regular status intervals and with instant event notification, and the truck detecting it packs this data and passes it to the server for analysis.
- The server responds with alerts and re-commanding, and also reports performance to various back end and server-side users.

Active Navigation: real-time communication for updates of road conditions from a parallel server communicated with the packed synchronous approach. Current position and next job position are communicated from the back end processor or from an on-board main control unit, through the system of the invention (in real time) to the server, where relevant information is parsed and sent to a navigation processor, which may be a part of a back end sub-system or may be a third party server. This navigation processor then considers real-time road status and communicates in real time back through the system of the invention to the vehicle, in real time, with enough speed to enable the information to be useful for re-commanding. This implementation of the invention avoids costly on-board systems and the complex linkage to real-time road use updates.

Road Use Reporting—Vehicle position and activity can be reported as to road use by time and by speed, enabling road use management by time, regulatory reporting, and road use cost support, such as taxation.

Security Monitoring—Biometrics-triggered management: sliding a finger a certain way triggers video surveillance and text to speech commands in-cab. A certain signal transmitted to a server, through the system of the invention, may signal a panic situation, may trigger the server to cause an alarm to be activated, the gearing to be reduced, the engine to be turned off, the doors to be locked (through communication to the vehicle through the invention), or may cause a video to begin for the purposes of verifying security situation.

Safety Monitoring—Near Vehicle proximity in combination with speed, tire pressure and temperature, and brake temperature. Conditions such as low tire pressure can be communicated to the driver to cause tire changing to avoid tire overstress and rupture. Brake temperatures can be monitored to implement gearing changes to limit speed. Near proximity at certain speeds can be monitored to implement cab alarms to awaken sleepy drivers, or a vehicle can be speed reduced or geared down in such near proximity and/or high grade situations.

Driver Performance data—driver performance can be monitored in terms of acceleration, deceleration, braking, cruise time, idle time, PTO time, and show usage with all parameters, in real time, for automated exception reporting and real-time performance behavior modification by messaging from the server to the driver.

Vehicle operating conditions such as these can be used to modulate vehicle performance, security, and safety, but in order to do so in a fast enough time to permit re-commanding, conditions must be sampled and packed with other operating data and sent to the server for analysis, with real-time re-commanding to modulate performance to a desired result. Without the system of the invention, communication is either not fast enough to offer real-time data, or data cannot be analyzed in conjunction with other data to utilize data dependencies in analysis and decision making, or the requisite amount of data simply is not available at the processor.

The Vehicle to Server Pipe

The always-on communication between the vehicle Main Control Unit and the data server, using 2+G cellular connectivity, enables data to be analyzed at the server in time for re-commanding of the vehicle. The communications protocol used enables cost effective. The system is set up to require the on-board sub-system to initiate connectivity. When the cellular modem calls the cell tower and hears a response, it sends its cellular authorization, and when the cell system authorizes connectivity, the on-board sub-system initiates a data log in over one of several cellular gateways. This gateway takes the cellular call and routes it to the CarrierWeb data center. The CarrierWeb data center then receives the call, authenticates the call as being from a known and acceptable CarrierWeb sub-system, and it then acknowledges a persistent connection via an IP address. The system uses non-routable addresses to prevent other users from breaking into the connection, and the connection remains persistent, as long as cellular reception continues.

The on board sub-system communicates status at least once every minute, which keeps the data session open, and it communicates events as they happen, asynchronously. The communications protocol includes only data to be communicated in order to avoid costly overhead data communications. This data can include only position data if no other operational transaction has occurred in the previous minute. If an operational status has changed, then all related on-board parameters are recorded and packed with the position and time and sent to the server. The server parses the data based on what data types require updating due to the transaction occurring on-board. For example, if a driver starts a job loading event, then position, time, engine status (fuel used, sped, rpm, acceleration/braking/torque, idling, cruise, gearing, etc) is recorded and attached to the transaction. The trailer status (door open/close and perhaps other security data, temperature, tire status, hitch status to truck, etc.) may also be sampled and attached to the transaction. However, trailer status, as an example, may be transmitted separately and coupled with position and time data at the server to minimize data communication.

In this way, the costs associated with a specific delivery activity, including labor cost, fuel cost, and capital utilization (truck depreciation and maintenance), are known in the minute that the event happens, rather than being estimated at some later date. In addition, cost parameters such as dead head (driving without a load) and dwell (wait time) can be understood and matched to a job or an order or a customer every minute, enabling feedback of the entire event and adjustment of commands as appropriate.

In addition, jobs can be created and modified either in the field (or on the road) or can be analyzed in conjunction with other vehicles so multi-vehicle job orders can be created, modeled, and evaluated in terms of performance, efficiency, regulatory requirements, and cost.

The on board power system is based on power from the vehicle battery. However, a small, low energy on-board power buffer is used to maintain power during switching glitches, as with engine cranking. This constant powering is important because position stamps can take time to be recorded in certain area, like urban canyons, and position stamps are needed to complete distribution transaction recording. This on-board power buffering uses the vehicle power to trickle charge a re-chargeable battery that is switched into the system during glitches.

Server-Side Sub-System

Figure 6:
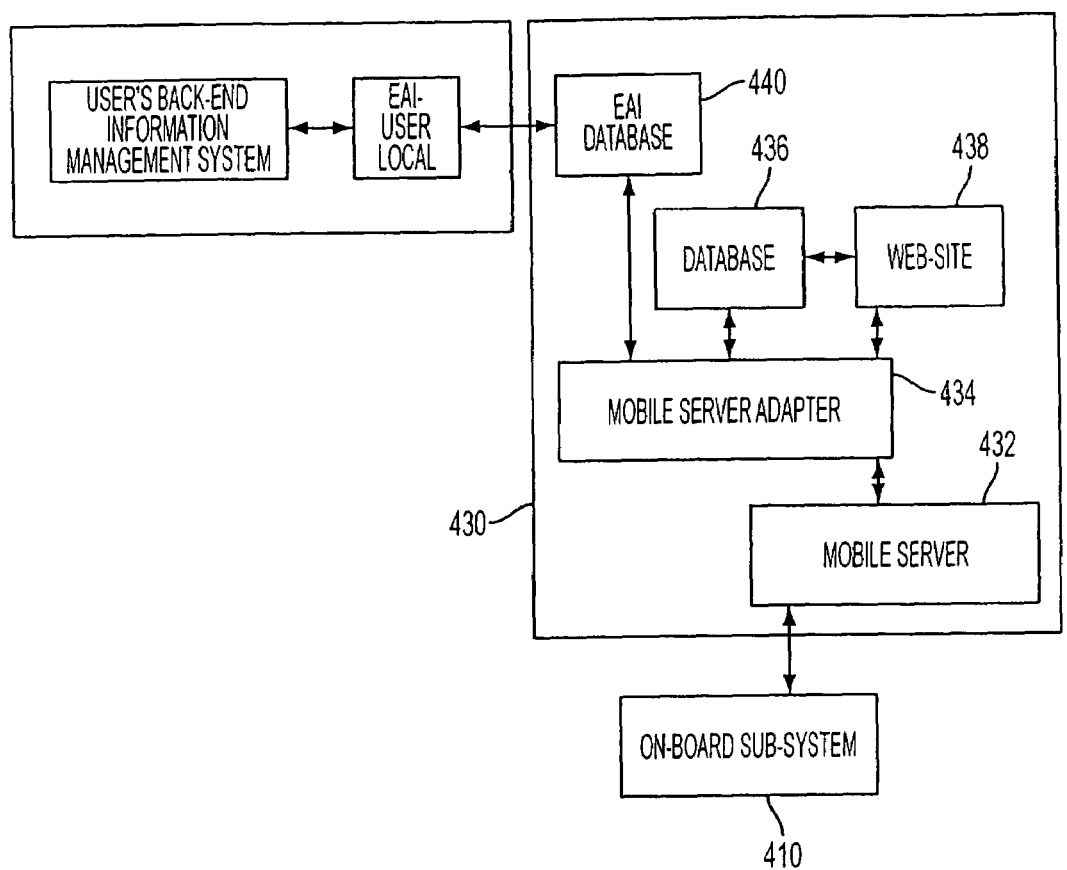
FIG. 6 is a block diagram illustrating details of the server side sub-system.

FIG. 6 illustrates further details of the data center 430 in accordance with one or more embodiments of the present invention. The data center 430 includes a mobile server 432, a mobile server adapter 434, a database 436, a web server 438 capable of hosting a website, and an EAI database 440. When asynchronous data is received at the mobile server 432, the data source (vehicle) must be verified and authenticated, which is done by a GPRS Server 434. Then the data is data parsed by the GPRS Server Adapter 434, and the data is sent to various parallel paths to different processors: a database to log the data, the web-server to support users logged in to the system, and the EAI (External Application Interface) database to prepare to send data to the user's back end.

After the GPRS server 434 authenticates the communication, it sends an acknowledgement of the message being sent back to the vehicle. Each vehicle originates the communication and will continue to process and store information but will not transmit it until the previous message has been sent and delivery has been received, with verification that data received is correct. Once this confirmation has been received by the vehicle, it will send the next message with whatever data has been received embedded into it for parsing and storage by the server. In this way, message integrity is guaranteed, and the on-board asynchronous parallel data will have been turned into a parallel message but communicated serially and asynchronously to the server, which parses it and turns it into parallel synchronous data required by the server.

All server-side components (GPRS Server, GPRS Server Adapter, Web Server, Database, EAI Database) are completely independent from each other and can be implemented on separate, even multiple machines. This arrangement allows parallel processing within the server-side sub-system. But since vehicle communications are controlled by the GPRS Server, these communications are serially managed. However, multiple data is packed into the serial message, allowing for an effectively parallel communication. Furthermore, many of the functions performed by various elements of the present invention can be implemented using common processors and/or computer systems.

After the server 432 records the data received, from whatever device sent it, it categorizes it and send it to one or more databases 436 as required by the type of data. Each data can then be analyzed and acted upon and a re-commanding transmitted back to the vehicle to take appropriate action, in real time, like seconds, when the vehicle and/or driver has the time to optimize the status/operation. The data analysis can be automated by the server 432, can be validated by dispatcher logged into the server 432, or can be transmitted to a third party sever, such as user server, route optimizer server, navigation server, etc. The always-on pipe is critical to this function because if a message with a real-time-dependent command is not received, as if with a dropped communication, then with the next vehicle logon, the command must be re-evaluated given the time of the re-logon and actual receipt of that command.

The real-time server-side sub-system data access is also necessary because different users, such as customers, security agents, logistics forwarders and brokers, schedule based on the timing of distribution transactions and events. The server can authorize these users access to the vehicle status information based on real time status, such as position, job being implemented, etc.

The Back End Sub-System

Figure 7:
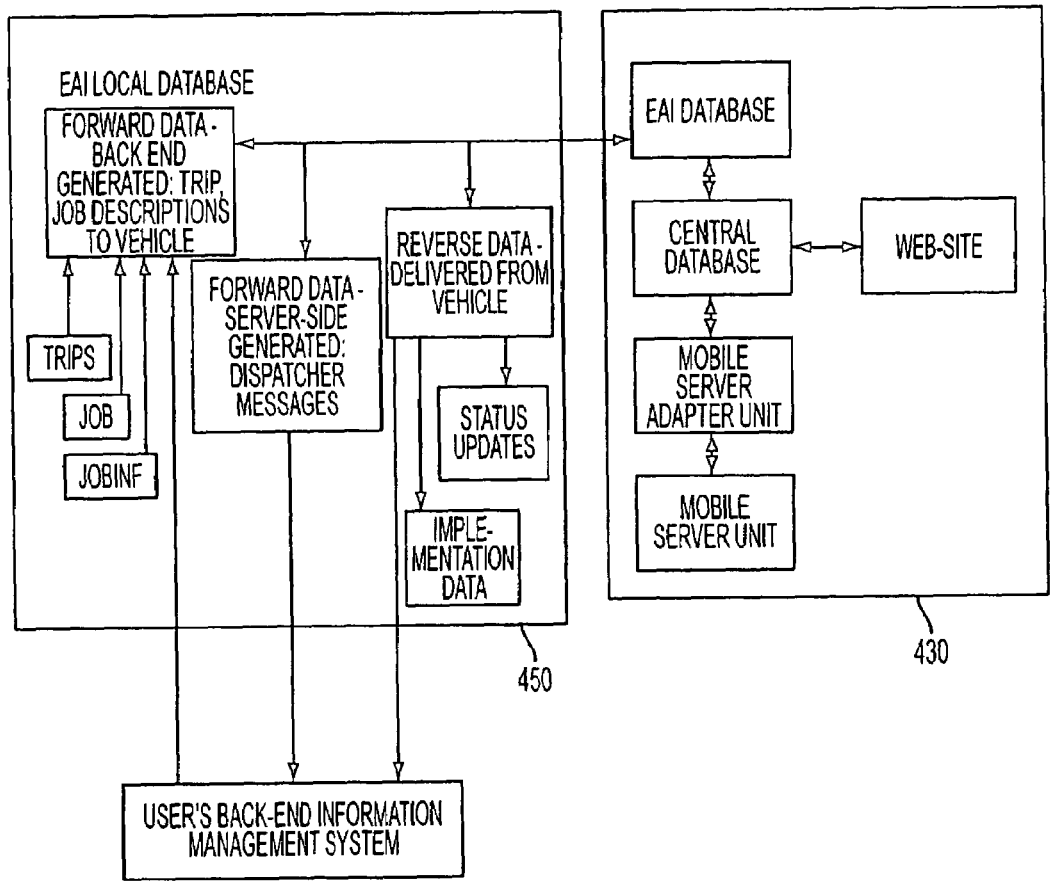
FIG. 7 is a block diagram illustrating details of the back end sub-system.

FIG. 7 illustrates various details of a customer system 450 in accordance with at least one embodiment of the present invention. The customer system 450 includes a local EAI (external application interface) database that synchronizes each minute with the EAI database server-side. The user's back end can then communicate with the local EAI tables to receive and send information. Forward information is that data going to the vehicle, and it consists of two types of data: data generated on the server and sent to the vehicle, and data generated at the back end and sent to the server to be forwarded on to the vehicle (this generally includes trip and job commands, including allowed activities by driver, truck, trailer, location, and time). The back end-generated data is produced by the user asynchronously, and the data is stored in the local EAI for communication to the server by periodic, synchronous XML soap calls over the public internet or VPN. The reverse data are information from the vehicle that are received by the server and then passed on to the back end with each synchronization (by XML soap call, for example) for reporting.

Figure 8:
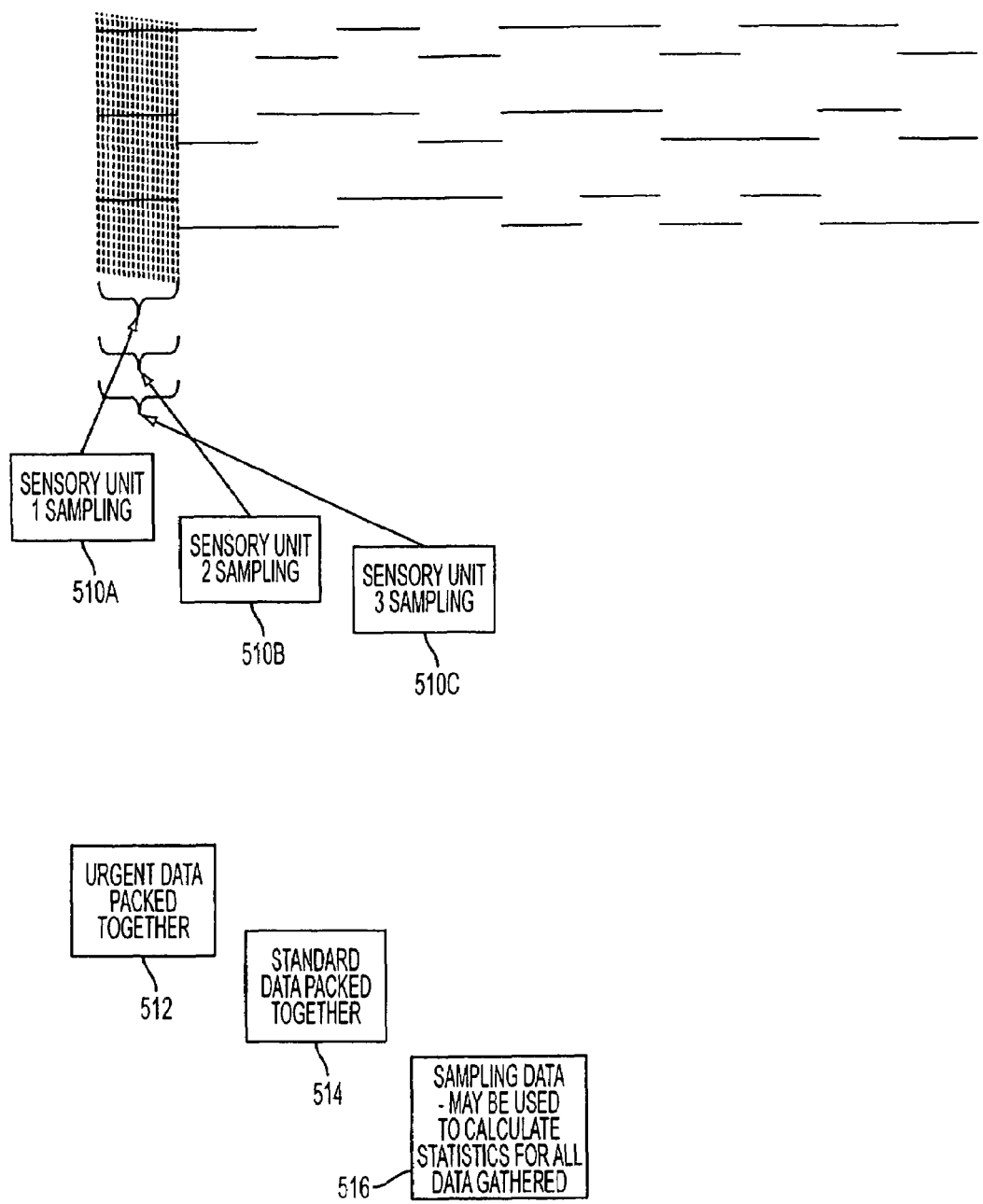
FIG. 8 illustrates the on-board data synchronizing and packing diagram—merging multiple and parallel asynchronous data into a 'packed' synchronous data set for economical communication.

FIG. 8 illustrates the details for synchronizing data in accordance with at least one embodiment of the present invention.

Data from sensory units (510A) 510B, 510C) is sampled, and when a start identifier is detected by the sampling, the remaining samplings record bit by bit data, loading a buffer from each sensory unit 510. By sampling the sensory units 510 in an alternating fashion, data is recorded into the auxiliary control unit 420 and synchronized for packing by the main control unit 416. In this way, sensory units 510 can submit data in sub-seconds, seconds, or minutes, as appropriate to the type of data Sensory data that has been synchronized by the auxiliary control unit 420 is passed to the main control unit 416, where it is packed into a binary representation with other sensory data. The packing refers to joining and multiple encoding of sensory data to maximize cellular transmission speed, throughout and to minimize the data transmission cost. Data is packed and managed as per urgent 512, standard 514, and sampling 516 data classes. The main control unit 416 then manages the interface with the modems, through a gateway interface managed by the auxiliary control unit 420, which can direct the communication by one of multiple modems. The main control unit 416 also manages data display, if appropriate to the user interface unit.

Figure 9:
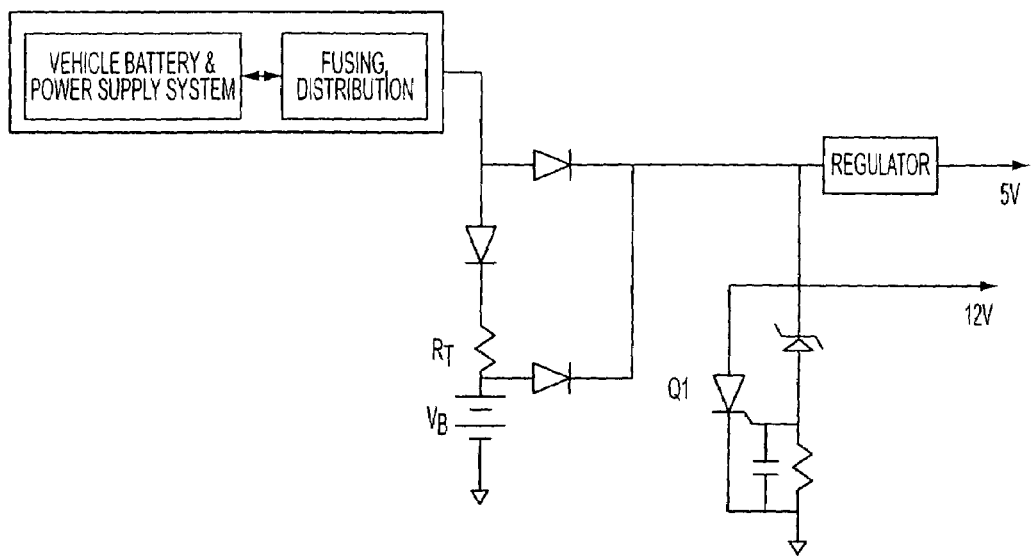
FIG. 9 is a circuit diagram illustrating an exemplary power management system.

FIG. 9 is a circuit diagram illustrating a power management system in accordance with one or more embodiments of the present invention. The power management system on the truck/powered unit, is capable of offering power integrity throughout the intended environment, including vehicle idle times (and battery run down) and engine cranking events, which can cause power loss and void position registration. If position information is voided, then a complete audit record of performance, and the ability to automatically audit performance and appropriately re-command the vehicle, is lost. Therefore, a power system must offer cost-effective and safe power for the period of possible outages and must not cause heating that would require heat sinking (as any heat sinking would limit application, which is intended to be under dashboards).

This power management system uses the vehicle battery to provide trickle charging to a small rechargeable battery. During engine cranking events, voltage is lost for a period of up to the order of magnitude of seconds, which, with the energy load of GPS and user interfaces, cannot be maintained with other short-term energy storage devices, such as capacitors. Downstream from the battery, an active voltage clamping circuit provides protection from surges until the vehicle fuse can clear a fault. For short term surges, varistors are used to clamp voltages to safe levels. Voltage regulators then manage menial voltage tolerances into levels sustainable for processor and control functions.

According to an exemplary embodiment of the invention, power is managed by electronically interrupting a voltage line that supplies voltage to a power line coupled to the selected device when a voltage on the line is outside a predetermined range. A secondary voltage source is connected to the power line of the device while electronically interrupting the voltage line to maintain the output voltage to the at least one device at an acceptable level. Next, the voltage line is reconnected when the voltage returns to the predetermined range. The secondary voltage source is disconnected from the power line when the voltage returns to within to the predetermined range. Finally, the secondary voltage source recharged by the voltage line while it is disconnected from the power line.

Figure 10:
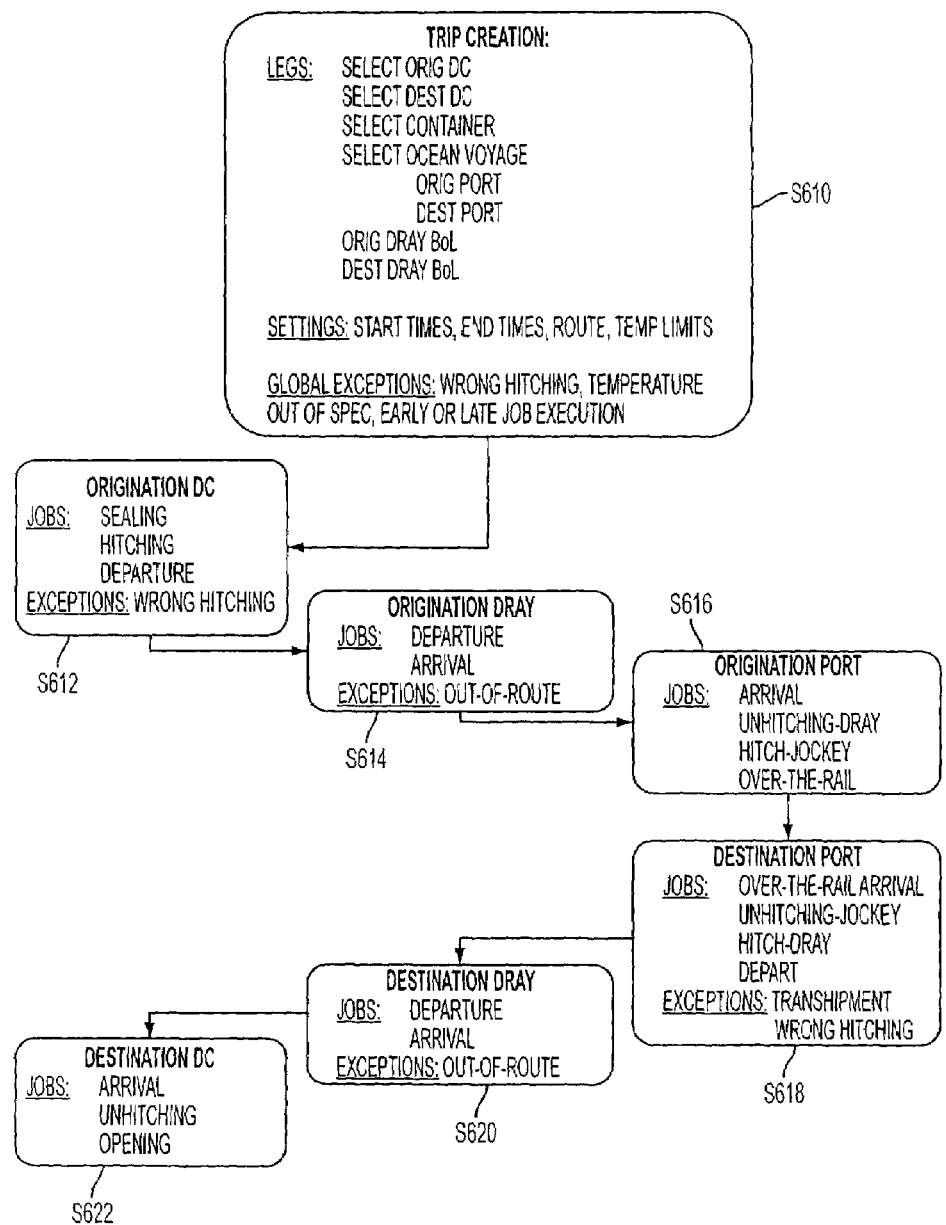
FIG. 10 illustrates an exemplary implementation of the present invention for end to end solution data flow.
Figure 11:
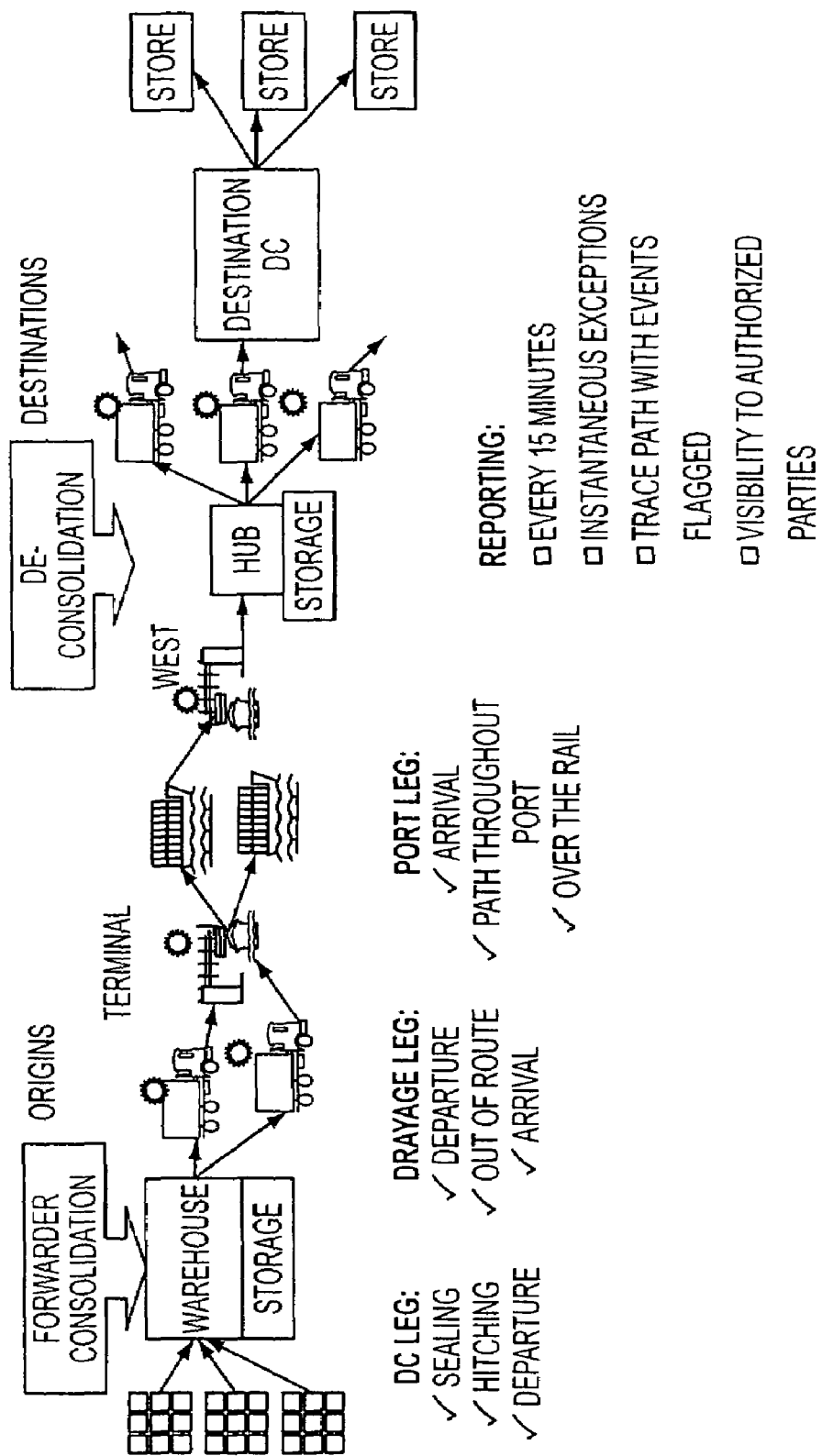
FIG. 11 illustrates the journey definitions for the end to end solution shown in FIG. 10.

FIGS. 10 and 11 illustrate the details of applying the present invention for an end to end solution. At step S610, details of the trip are created. This can entail, for example, selecting travel origination, destination, departure times, etc. At step S612, various details are collected for the specific origination. At step S614, various information regarding the origination drayage is collected. At step S616, information regarding the origination port is collected. At step S618, information regarding the destination port is collected. At step S620, information regarding the destination dray is collected. Finally, the vehicle arrives at the appropriate destination at step S622 where additional information is collected.

This type of implementation is an extension of the combination of the CarrierWeb for Trucks, CarrierWeb for Trailers, and CarrierWeb for Yards solutions with the yard being a large yard. In this case, the RFID monitoring solution, and the interface with the communication system, requires the following features for real-time monitoring application:

a longer monitoring interval to avoid radio transmission collisions from a large number of transmitters (as in a dense port or on a densely loaded freight ship), and multi-power level transmission that uses high power (at long intervals to save battery power) to transmit a long distance and a lower power to communicate at shorter intervals after a start-motion activity is logged. Therefore, the RFID system must be modulated in transmission interval with activity status;

An architecture that supports the parallel, asynchronous data input being converted to a synchronous, packed data structure for management with all other operating data, either in a truck system on a yard system;

receiver filtering to detect data with low signal-noise ratios;

receiver that operates on low voltage and low energy for solar powering at yard locations, which enables low installation cost;

receiver that daisy-chains and wirelessly communicates data from one receiver to another, which allows low installation cost.

Implementation of the Invention

Using the invention, CarrierWeb provides transportation, distribution, and mobile activity solutions such as:

unlimited messaging between dispatch and driver;

activity based costing, consisting of fuel and labor cost per activity;

trailer management, including temperature monitoring, door monitoring and lock control, trailer/container hitch/unhitch reporting and auditing;

fuel cost optimization, based on vehicle tuning, route optimization (including consideration of current road conditions such as construction, traffic, breakdowns, accidents, etc.), and driving behavior optimization;

smart load planning, considering drive time remaining, detention, deadheading, and dwell;

mobile security, to include detection of out-of-tolerance conditions, either due to vehicle position/time, door openings/position, driver input (panic button or message, possibly with biometrics verification)

consignment management, including automated freight management, or the ability to post asset availability or capacity to automated load matching, freight auctions, or other services that can fill up capacity with no added cost.

All of these parameters can be presented either or both independently and dependently with other parameters to allow the user to generate an entire picture of the operational event and to compare, immediately, with planned activities so either a detailed result can be depicted or merely an exception report can be depicted.

In accordance with one or more embodiments, the present invention can be implemented in manned or unmanned yards, depots, and ports. In order to offer a complete management system, a yard must be managed to provide monitoring service when trailers or containers are unhitched from a truck/powered vehicle. A real-time management system is only as strong as its weakest link, meaning every activity and every location and time slice must be monitored. Therefore, an un-tethered monitoring and communication capability must be available. By utilizing independent data synchronizing and packing, a complete end (loading) to end (unloading) solution is created with the invention. In this case, the term "independent" means that trailer/container data is managed either by the truck, in conjunction with other truck operating data, or by the yard monitor. So the asset is monitored either behind a truck or in a yard, without interruption. This use can include relative signal strength of RFID data to determine detailed location, such as position in a yard or port or position by loading dock number at a distribution center.

The present invention can be implemented for mobile inventory management and paperless manifest management applications. This arrangement involves an RFID transmission unit on a pallet or other object to be loaded into a trailer or container. A receiver in the trailer/container recognizes the pallet/load when it is loaded into the vehicle, and this data is wirelessly daisy-chained to another receiver, either on a truck on in a yard. The truck/yard system then transmits the transaction of entry or exit (or the periodic status update) to the server. In this way, a completely automated record of inventory is made during the transportation process. Each transaction (or periodic status report) can have a load stamp, a time stamp, a trailer stamp, a truck stamp, a position stamp, a driver stamp. And by linking through the real-time communication system to the back end sub-system of the invention, a link to the SKU level can be maintained.

The present invention can also be implemented with road use reporting applications. The real-time management of status can include location, speed, and road use duty. Applications that provide for taxation or other variable payment in relation to asset use can maintain billing per use. This application is a manifestation of automated driver payment, trailer rental, brake system lease, etc, which enables a record of use for pay-by use activities. Another type of invention application is pay be movement, where cranes or other asset movement systems are used to compensate for effort used in management of the mobile activity.

The present invention can be implemented to virtual freight management applications. These implementations use the real-time operating data to review a vehicle's ability to implement available jobs, can possibly review operating conditions such as driver rest requirements, vehicle location, trailer type, monitoring and reporting capabilities required of the load, estimated pickup and delivery time, and implementation cost. Then back-end sub-system can then interact with a load management system to automatically select and negotiate with a vehicle, and perhaps a vehicle owner override/veto/accept criteria, to book jobs. This monitoring and dependent commanding can include partial job ordering/negotiating/commanding, as with filling back-haul capacity with available jobs.

In accordance with other embodiments, the present invention can be implemented to vehicle and/or driver performance monitoring applications. Vehicle performance can include speed, fuel efficiency, brake application, power take off, etc. Driver performance might include acceleration and deceleration profiles, idle time profiles, cruise time, coast time, brake applications, fearing, etc, and profiles can be made dependent on route, load, trailer type, etc.

The present invention is capable of offering a system/method/apparatus to provide real-time operational transaction a) reporting and b) management—this includes immediate re-commanding as a separate independent claim—of vehicle activities. Asynchronous data is collected from different sensors in parallel with each other. When any sensor status changes (experiences an operational transaction), the status of all other sensors is actively recorded and transmitted to the server over an always-on 2-way connection. Then, by parsing the data for each sensor and storing it (concurrently in series and parallel), the data can be stored, managed, and queried for any combination of operating parameters for any contiguous time periods and reconstruct any activity-based performance.

For example, when a driver changes activities from driving to resting, we take a cut-set of data (that spans all sensors for that time period) is taken and all fuel conditions are recorded. When the driver starts driving again, another cut-set is taken, and thus allows determination of the amount of fuel used while that driver rested, on a particular delivery trip, on a particular day of the week, in a particular region. The driver's pay may be affected by fuel used during resting, it may be affected by the number of working or rest hours, by the day of the week, and by the distance away from 'home base'. In order to record all this data to make operational reports, the system must both record a lot of data and take cut-sets of all data with a transaction of any one sensor.

On this basis, the present invention offers a real-time activity-based operational reporting system. The system can determine operating costs based on actual activities (often takes weeks in practice without real time reporting of all major vehicle cost items, which are capital costs for vehicle lease, distance traveled for vehicle maintenance allocation, driver/labor, and fuel). This operational reporting system can be just involving data sensed on board and reported to the vehicle, without vehicle re-commanding.

Additionally, the system of the present invention can re-command the vehicle immediately, fast enough to effect performance based on data sensed. For example, the system can determine optimal driver/truck/trailer schedules based on driver-hours remaining that day, updated every minute, which enable dispatchers to plan loads and decide which trucks and which drivers are available and have driving hours left and send updated work instructions to the vehicle. The system could also review vehicle speed, check with speed limits of the road it is on, and advise the driver to slow down, or advise the driver of near-proximity obstacles (like tailgating).

The present invention utilizes a serial messaging protocol to ensure that if we lose a cell connection or internet connection, we stop sending messages and buffer all following messages yet to be sent until a connection is re-established. So each message is acknowledged, and the next message to be sent is not sent until the previous message has been acknowledged. At the server, a syntax checker checks that messages arriving are valid communication data streams as defined before they are transmitted from the on-board transmitter. This device must be one of a limited number of dedicated machines, as all vehicles in the field (could be millions of vehicles) must access one of the limited number of dedicated machines by a unique address, such as with an IP address for each machine—and the vehicles must have the pre-defined IP addresses stored in on-board memory so they can request the cell/internet gateway to logon to one of these machines over the internet.

When a message arrives at the server from a vehicle, and after its syntax is checked, it is stored and logged and sent to one of a plurality of semantics checkers, which are separate physical machines that decode the message and send it to: (1) a database, and (2) sends it to a web server for display to a user logged onto our data center, and (3) an EAI server to send to user's back end information system. This semantics checker decodes messages and stores them in the appropriate places, and so this work is separated form the syntax checker in terms of being implemented on a different machine. A multiplicity of semantics checker can be used, and the syntax checker determines which semantics checker to use based on a load matching algorithm.

The syntax checker maintains the connection with the vehicle, sending handshake messages back to the vehicle to acknowledge receipt of the message. This must be done very quickly to enable a high volume of messages and fast communication. Next messages are not sent from the vehicle to the server until the previous message has been acknowledged. So the syntax checker is capable of maintaining communications with the vehicle without waiting for the semantics checker to complete pending processes.

The syntax checker can also be used to maintain a message queue until the semantics checker verifies that the data has been decoded and stored successfully in the required places (1)-(2)-(3) above. In this way, the of the present invention:

maintains fast communications with vehicles, so next messages can be sent to the syntax checker, enabling high volume of messaging in a fast time with a practical number of servers;

maintains message integrity and reliability by logging the message in the fats syntax checker while the slower semantics checker does the decoding and parsing and storing of the data—when storing operating data required to report driver activity changes that affect regulatory reporting and driver payroll and customer billing, message integrity is essential;

handles a high volume of messages required to manage a fleet of tens of thousands of vehicles, with data arriving at the server every second.

Common practice for Internet sites is to use both syntax and semantics checkers on the same machine as they do not have the combination of a limited number of dedicated IP addresses, fast handshake requirements, and combination of fast and slow duties. Routers can point to a large number of IP addresses, but vehicles cannot. Accordingly, the system must be able to process messages in serial fashion in order to selectively exit the message process functions in various parts and process parts of it in parallel to speed up overall processing time and to reduce the overall serial process delay and to being processing the next message effectively before the previous one was finished, so more messages can be processed while still using the serial handshaking method to manage cellular-internet connection issue. The large number of vehicles required of the small number of IP addresses and the requirements of fast handshaking require a unique method to process next syntax messages at the same time as the previous message is being semantics checked and processed, while still adhering to the serial message protocol. This method enables management of the always-on communications with enough data to offer real-time operational reporting and management.

The many features and advantages of the invention are apparent from the detailed specification, and thus, the appended claims are intended to cover all such features and advantages, which fall within the true spirit and scope of the invention. Further, since numerous modifications and variations will become readily apparent to those skilled in the art, the invention should not be limited to the exact construction and operation illustrated and described. Rather, all suitable modifications and equivalents may be considered as falling within the scope of the claimed invention.

What is claimed is:

1. A wireless mobile resource management system comprising:
    an on board system including:
    a position locating system for determining a location of the on board system,
    a plurality of sensors for monitoring conditions and independently collecting information corresponding to sensed states of the conditions being monitored, each sensor collecting the information asynchronously with respect to other sensors, and
    a transceiver for transmitting and receiving information to and from the on board system over a wireless communication network;
    a processor for collecting the asynchronous sensor data collected by the plurality of sensors and saving the asynchronous data in the form of synchronous data;
    a data center for monitoring at least one sensed state from the plurality of sensors and providing instructions to the on board system in response to the at least one monitored sensed state, the data center including:
    a communication server for establishing a first communication link with the on board system over the wireless communication network, and further establishing a second communication link over a data communication network,
    a data center processor for processing the synchronous data, and generating streams of sensor data representative of the asynchronous sensor data collected by the plurality of sensors, and
    a database for storing operational transactions of the on board system at predetermined time intervals and/or upon a change in a sensed state of at least one of the conditions being monitored,
    wherein a continuous two-way connection is established between the on board system and the data center across the wireless communication network; and
    wherein the synchronous data saved by the processor is synchronous with respect to the data center processor.

2. The wireless mobile resource management system of claim 1, further comprising at least one customer system for establishing a third communication link over the data communication network, communicating with the data center, accessing conditions monitored by the sensors, and further transmitting control data to the on board system.

3. The wireless mobile resource management system of claim 1, wherein processor for collecting the asynchronous sensor data is included in the on board system.

4. The wireless mobile resource management system of claim 1, wherein processor for collecting the asynchronous sensor data is included in the data center.

5. The wireless mobile resource management system of claim 4, wherein processor for collecting the asynchronous sensor data is the data center processor.

6. The wireless mobile resource management system of claim 1, wherein database stores operational transactions of the on board system related to location at predetermined time intervals.

7. The wireless mobile resource management system of claim 1, wherein database stores operational transactions of the on board system upon a change in a sensed state of at least one of the conditions being monitored.

8. The wireless mobile resource management system of claim 1, wherein the position locating system is satellite based.

9. The wireless mobile resource management system of claim 1, wherein the position locating system is cellular based.

10. The wireless mobile resource management system of claim 1, wherein the position locating system is based on both satellite and cellular communication networks.

11. The wireless mobile resource management system of claim 1, wherein at least one of the plurality of sensors includes an RFID transmitter.

12. The wireless mobile resource management system of claim 1, wherein:
    the on board processor includes an auxiliary processor for alternately receiving sampled information collected by the plurality of sensors and generating the synchronized data; and the on board processor processes the synchronized data stream for transmission over the wireless communication network.

13. The wireless mobile resource management system of claim 1, wherein the control data includes at least one of load plans, updates, messages, and instructions.

14. The wireless mobile resource management system of claim 1, wherein the operational transactions include time, date, and position information for the on board system.

15. The wireless mobile resource management system of claim 14, wherein the operational transactions further include the sensed state of the conditions being monitored by the on board system.

16. The wireless mobile resource management system of claim 1, wherein the conditions being monitored include environmental conditions.

17. The wireless mobile resource management system of claim 1, further comprising a vehicle, and wherein the on board system is contained in the vehicle.

18. The wireless mobile resource management system of claim 1, wherein the conditions being monitored include unauthorized access to a vehicle equipped with the on board system.

19. The wireless mobile resource management system of claim 18, wherein the vehicle is self powered.

20. The wireless mobile resource management system of claim 19, further comprising a towable unit selectively connectable to the self powered vehicle.

21. The wireless mobile resource management system of claim 18, wherein the conditions being monitored include unauthorized movement of the vehicle.

22. The wireless mobile resource management system of claim 18, wherein the conditions being monitored include unauthorized transportation of the vehicle from a predetermined location.

23. The wireless mobile resource management system of claim 1, wherein the on board system further comprises an interface unit for displaying information and receiving input.

24. A wireless mobile resource management system comprising:
a self powered vehicle;
a towable unit selectively connectable to the self powered vehicle, and including an area for storing at least one mobile asset;
an on board system located in at least one of the self powered vehicle and the towable unit, the on board system including:
a position locating system for determining a location of the on board system,
a plurality of sensors for monitoring conditions and independently collecting information corresponding to sensed states of the conditions being monitored, each sensor collecting the information asynchronously with respect to other sensors, and at least one sensor including an REID transmitter, and
a transceiver for transmitting and receiving information to and from the on board system over a wireless communication network;
a processor for alternately collecting the asynchronous sensor data collected by the plurality of sensors and generating synchronized data; and
a data center for monitoring at least one sensed state from the plurality of sensors and providing instructions to the on board system in response to the at least one monitored sensed state, the data center including:
a communication server for establishing a first communication link with the on board system over the wireless communication network, and further establishing a second communication link over a data communication network,
a data center processor for processing the synchronous data, and generating parallel streams of sensor data corresponding to the asynchronous sensor data collected by the plurality of sensors, and
a database for storing operational transactions of the on board system at predetermined time intervals and/or upon a change in a sensed state of at least one of the conditions being monitored,
wherein an always on, continuous two-way connection is established between the on board system and the data center across the wireless communication network;
wherein the synchronous data saved by the on board processor is synchronous with respect to the data center processor.

25. The wireless mobile resource management system of claim 24, further comprising at least one customer system for establishing a third communication link over the data communication network, communicating with the data center, accessing conditions monitored by the sensors, and further transmitting control data to the on board system.

26. The wireless mobile resource management system of claim 24, wherein processor for collecting the asynchronous sensor data is included in the on board system.

27. The wireless mobile resource management system of claim 24, wherein processor for collecting the asynchronous sensor data is included in the data center.

28. The wireless mobile resource management system of claim 27, wherein processor for collecting the asynchronous sensor data is the data center processor.

29. The wireless mobile resource management system of claim 24, wherein database stores operational transactions of the on board system related to location at predetermined time intervals.

30. The wireless mobile resource management system of claim 24, wherein database stores operational transactions of the on board system upon a change in a sensed state of at least one of the conditions being monitored.

31. A wireless monitoring system comprising:
a self powered vehicle including a plurality of mobile control units, each mobile control unit including:
a processor for collecting data of the at least one sensed state from the at least one monitored mobile asset during connection to the self powered vehicle,
a transceiver for wirelessly transmitting the data which is collected by the processor after processing to a wide area wireless communication system and receiving data from the wireless communication system,
a plurality of towable units selectively connectable to the self powered vehicle, each towable unit including:
an area in which at least one mobile asset is stored during at least towing of a towed unit by the self powered vehicle,
at least one sensing unit for monitoring the at least one mobile asset and providing data regarding at least one sensed state of the at least one mobile asset, the sensing unit being wirelessly coupled to an associated one of the mobile control units during connection of the towed unit to one of the self powered vehicles; and
a management control system which provides instructions to the mobile control units for responding to the at least one sensed state of the at least one monitored mobile asset and real time monitoring of the at least one sensed state of the at least one mobile asset of each mobile unit associated with the self powered vehicle; and wherein the wireless communication system provides two way continuous connectivity between the plurality of mobile control units and the management control system.

32. A system in accordance with claim 31 wherein:

the at least one sensing unit is associated with at least one REID system associated with a mobile asset and a towed unit which wirelessly communicates over a wireless communication link to provide to the towed unit on which the at least one sensing unit is located the at least one sensed state of the at least one mobile asset and the instructions and at least one sensing unit which monitors at least one state of an engine of the self powered vehicle which monitors at least one state of the engine with the at least one state associated with the mobile asset and the at least one sensed state of the engine being processed by the processor into a data stream which is synchronous to the at least one sensing unit and asynchronous to the wide area communication system and the management control system; and the management control system in response to reception of the synchronous data stream from at least one mobile control unit provides the instructions to the at least one mobile control unit associated with at least one of the self powered vehicles which are responsive to the at least one sensed state which pertain to operation of the engine of at least one of the self powered vehicles and/or the at least one mobile sensed state associated with the at least one mobile asset of at least one of the towed units.

33. A method for wirelessly managing mobile resources comprising:

providing an on board system on a mobile resource;

determining a position location of the on board system;

monitoring conditions and independently collecting information corresponding to sensed states of the conditions being monitored by a plurality of sensors, each sensor collecting the information asynchronously with respect to other sensors;

transmitting and receiving information between the on board system and a data center over a wireless communication network;

collecting the asynchronous sensor data collected by the plurality of sensors and saving the asynchronous data in the form of synchronous data;

monitoring at least one sensed state from the plurality of sensors and providing instructions to the on board system in response to the at least one monitored sensed state;

establishing a first communication link with the on board system over the wireless communication network, and further establishing a second communication link over a data communication network;

processing the synchronous data, and generating streams of sensor data representative of the asynchronous sensor data collected by the plurality of sensors; and storing operational transactions of the on board system at predetermined time intervals and/or upon a change in a sensed state of at least one of the conditions being monitored, wherein a continuous two-way connection is established between the on board system and the data center across the wireless communication network; and wherein the synchronous data saved by the processor is synchronous with respect to the data center processor.

34. A method for at least wirelessly monitoring mobile resources comprising:

monitoring a plurality of conditions of a mobile resource with an on board system comprising a plurality of sensors provided on board the mobile resource, one of the plurality of sensors collecting information concerning a first condition at a time independent from a time at which another of the plurality of sensors collects information concerning a second condition;

independently collecting information corresponding to sensed states of the conditions being monitored by the plurality of sensors;

upon a status change of one of the plurality of sensors, creating a data record containing the status of all of the plurality of the sensors; and transmitting at least one of the information collected corresponding to the sensed states of the conditions being monitored by the plurality of sensors or the data record containing the status of all of the plurality of the sensors from the on board system to a database over a wireless communication network, wherein a continuous two-way connection is established between the on board system and the database across the wireless communication network.

35. The method for at least wirelessly monitoring mobile resources according to claim 34, further comprising transmitting a command over the wireless communication network to the mobile resource to manage the mobile resource based on at least one data record recording the status of all of the plurality of the sensors.

36. The method for at least wirelessly monitoring mobile resources according to claim 34, wherein the plurality of sensors is a subset of all of the sensors provided on the mobile resource.

37. A system for at least wirelessly monitoring mobile resources comprising:

an on board system comprising a plurality of sensors provided on board the mobile resource for monitoring a plurality of conditions of a mobile resource, one of the plurality of sensors collecting information concerning a first condition at a time independent from a time at which another of the plurality of sensors collects information concerning a second condition;

a processor for independently collecting information corresponding to sensed states of the conditions being monitored by the plurality of sensors;

a processor for creating a data record containing the status of all of the plurality of the sensors upon a status change of one of the plurality of sensors;

a database; and a wireless communication network for transmitting at least one of the information collected corresponding to the sensed states of the conditions being monitored by the plurality of sensors or the data record containing the status of all of the plurality of the sensors from the on board system to the database, wherein a continuous two-way connection is established between the on board system and the database across the wireless communication network.

38. The system for at least wirelessly monitoring mobile resources according to claim 37, wherein the plurality of sensors is a subset of all of the sensors provided on the mobile resource.

* * * * *